United States Patent [19]

Townend

[11] 4,111,803
[45] Sep. 5, 1978

[54] PROCESS FOR RECOVERING PROTEINACEOUS MATTER FROM ACID WHEY AND TANNERY UNHAIRING EFFLUENTS

[75] Inventor: Robert E. Townend, Elkins Park, Pa.

[73] Assignee: The United States of America as represented by the Secretary of Agriculture, Washington, D.C.

[21] Appl. No.: 803,191

[22] Filed: Jun. 3, 1977

[51] Int. Cl.$^2$ ............................ C02B 1/20; C02C 5/02
[52] U.S. Cl. ........................................ 210/51; 210/56; 260/122; 426/657; 426/807
[58] Field of Search ............ 210/42 R, 45, 47, 51–53, 210/56; 260/112 R, 121, 122; 426/2, 583, 657, 807

[56] References Cited

U.S. PATENT DOCUMENTS

| | | | |
|---|---|---|---|
| 1,277,776 | 9/1918 | Taylor | 210/53 |
| 1,347,823 | 7/1920 | Peck | 210/45 |
| 1,900,995 | 3/1933 | Nichols | 210/53 |
| 2,074,082 | 3/1937 | Domagalla | 210/53 |
| 2,742,359 | 4/1956 | Rahn | 426/583 |
| 3,687,928 | 8/1972 | Brouwer et al. | 210/112 R |
| 3,936,375 | 2/1976 | Nettli | 210/45 |

*Primary Examiner*—Charles N. Hart
*Assistant Examiner*—Peter A. Hruskoci
*Attorney, Agent, or Firm*—M. Howard Silverstein; William E. Scott; David G. McConnell

[57] ABSTRACT

Tannery unhairing waste and acid whey are mixed in proportions containing from 20 to 40% by volume of the tannery waste to spontaneously precipitate proteinaceous matter from both waste effluents and leave a relatively clean supernatant liquid. When the mixture is warmed to about 70° C, all macromolecular components are quantitatively precipitated.

1 Claim, No Drawings

PROCESS FOR RECOVERING PROTEINACEOUS MATTER FROM ACID WHEY AND TANNERY UNHAIRING EFFLUENTS

BACKGROUND OF THE INVENTION

1. Field of the Invention

This invention relates to the recovery of proteinaceous matter from such waste protein-containing liquids as whey and tannery unhairing waste.

2. Description of the Prior Art

Precipitation of proteins from whey by heat denaturation is an old and straightforward procedure. In fact, the various whey proteins have been shown to be heat-denatured at different rates (J. Dairy Sci. 38, 351, 1955). However, the major whey proteins, α-lactalbumin and β-lactoglobulin are rather resistant to denaturation by heat at the pH and concentration at which they occur in acid whey (J. Dairy Sci. 49, 694, 1966; J. Dairy Res. 37, 233, 1970). Both of these proteins are stabilized in their native conformations by internal disulfide bonds (Biochem. Biophys. Acta 200, 184, 1970; J. Dairy Sci. 57, 1152, 1974) and, at least in the case of β-lactoglobulin, irreversible denaturation and the simultaneous appearance of new sulfhydryl groups has been thoroughly established (J. Dairy Sci. 33, 890, 1950; JACS 79, 126, 1957; J. Dairy Sci. 52, 585, 1969).

Tannery unhairing waste is an opaque, noxious liquid that has a 5-day biological oxygen demand (BOD) of over 19,000 ppm (JALCA 69, 50, 1974). Methods of disposing of this waste, which contains quantities of proteinaceous materials, are the subject of world wide studies (J. Water Pollut. Contr. Fed. 44, 1080, 1972; ibid 43, 998, 1971).

SUMMARY OF THE INVENTION

An object of this invention is to provide a means of recovering proteinaceous matter from protein-containing waste liquids such as acid whey and tannery unhairing waste.

Another object is to provide a means for reducing the biological oxygen demand of acid whey and tannery unhairing waste.

A further object is to recover from acid whey and tannery unhairing waste a potential animal feed supplement.

In general, the above objects are accomplished by a process wherein acid whey and tannery unhairing waste are mixed in proportions that contain from 20 to 40% by volume of tannery waste, the protein material precipitated from the mixture, and the precipitate separated and recovered from the supernatant liquid.

DETAILED DESCRIPTION OF THE INVENTION

Tannery unhairing waste or effluent, that is, the exhausted unhairing liquor not diluted with any rinse water, was obtained from a commercial tannery. Acid whey was obtained from a commercial dairy.

For best results, the pH of the mixed whey and unhairing waste should be adjusted to between 8 and 10, if necessary. Usually, mixtures made in the proportions recommended for this invention, that is, mixtures containing from 20 to 40% of the unhairing waste, have pH values from 8 to 10 and need no adjustment.

Since whey, the waste product from the manufacture of cheese, is produced in the United States at the rate of about 22 billion pounds annually, it poses a serious disposal problem. The usual disposal procedure of dumping it into nearby streams or other convenient receptacles is now prohibited in most areas by environmental protection laws. Consequently, my unexpected discovery that one highly polluting substance, tannery unhairing waste, could be mixed with whey to spontaneously precipitate out proteinaceous matter from both waste fluids and leave a relatively clean supernatant liquid is important to both the dairy industry and the tanning industry. In addition, I also discovered that all macromolecular components are quantitatively precipitated out of the mixture when the mixture is warmed to about 70° C. No peaks or bands indicative of macromolecular protein were found after ultracentrifugation and gel electrophoresis of a 10-fold concentrate of the supernatant liquid. Amino acid analysis of the precipitate showed that it was similar to a high quality protein chicken feed supplement.

The following examples illustrate the invention:

EXAMPLE 1

Tannery unhairing waste having a nitrogen analysis of 4.11 mg N/ml and a pH of 12.3 and batches of acid wheys having nitrogen analyses of from 1.2 to 1.4 mg N/ml and pH values from 4.39 to 4.61 were mixed in various proportions ranging from 10 to 70% by volume of tannery unhairing waste. A black heavy precipitate formed within a few minutes when the amount of tannery waste ranged from 20 to 40%: outside of this range the amount of precipitate was too small to be considered feasible for a commercial process. The precipitate settled readily and cleared the liquid of solid as well as some semi-solid floating material. The precipitate was easily centrifuged to a semi-solid self-adhering pellet which was separated by coarse screening. In some experiments, when about 25% tannery unhairing waste was mixed with about 75% acid whey, as much as 17% of the total nitrogen was spontaneously precipitated at ambient room temperature (20° –40° C.).

The supernatant liquids from the above experiments were heated by a water bath to about 70° C. for 15 minutes. Heavy white precipitates formed which, after the liquids were cooled, were removed by centrifugation. Upon analysis of the clear yellow supernatants, it was found that an additional 20–25% of the original nitrogen had been precipitated by this heat treatment. The results of one experiment are shown in Table I.

In contrast, when tannery unhairing waste alone is heated to the same temperature, only about 2% of its original nitrogen is precipitated and acid whey precipitates only minimally under the same conditions.

EXAMPLE 2

An 8-liter volume of tannery unhairing waste and acid whey containing 37.5% tannery waste, both wastes having a nitrogen analysis as in Example 1, was prepared and the precipitate centrifuged and collected. The clear supernatant was then heated to 65° C. by injected steam to precipitate more protein matter. The precipitates contained 7.24% N and 11.32% N, respectively, on a dry weight basis.

EXAMPLE 3

Three liters of tannery unhairing waste containing 9.54 gm N/liter and 9 liters of acid whey containing 1.2 gm N/liter were mixed. The pH of the mixture was 10.8; no precipitate formed. Then 13 ml of concentrated $H_2SO_4$ were added to adjust the pH to 9.55; this produced visible flocculation. The mixture was then heated to 70° C. and the precipitate centrifuged and collected.

heated to about 70° C. and the total precipitate centrifuged and collected.

TABLE I
Amount of Nitrogen Precipitated from Mixtures of Acid Whey and Tannery Unhairing Effluent

| Tannery Unhairing Effluent % by vol. | Total N concn. (calc.) mg/ml | Nitrogen in Supernatant after centrifugation mg/ml | Amount of Total N pptd. % | Nitrogen in Supernatant after heating and cooling mg/ml | Amount of Total N pptd. in 2 steps % |
|---|---|---|---|---|---|
| 15 | 1.92 | 1.75 | 8.66 | 1.12 | 41.8 |
| 20 | 2.04 | 1.79 | 12.5 | 1.18 | 42.4 |
| 22.5 | 2.11 | 1.80 | 14.7 | 1.28 | 39.5 |
| 25 | 2.17 | 1.89 | 13.2 | 1.35 | 38.1 |
| 27.5 | 2.24 | 1.94 | 13.5 | 1.40 | 37.5 |
| 30 | 2.30 | 2.01 | 12.8 | 1.50 | 34.8 |
| 32.5 | 2.37 | 2.06 | 12.9 | 1.54 | 35.0 |

196.2 gm of dried precipitate, which contained 4.7% N by weight and represented a yield of 23.2% of the original nitrogen, were collected. This example demonstrates that the process is flexible and can be applied to available volumes of unhairing waste and whey. As shown here, when there is not enough whey available, the pH of the mixture can be adjusted to the desired range by addition of concentrated sulfuric acid. This example also demonstrates that it is not necessary to collect the total precipitate in two individual steps. As soon as the unhairing waste and the whey are mixed, the mixture, provided the pH is at the desired level, can be heated to about 70° C. and the total precipitate centrifuged and collected.

I claim:

1. A process for removing and recovering proteinaceous matter from acid whey and tannery unhairing waste and reducing the biological oxygen demand of said acid whey and unhairing waste, comprising mixing aqueous acid whey and aqueous tannery unhairing waste in proportions such that the mixture contains from 20 to 25% tannery waste by volume adjusting the pH of the mixture to from 8 to 10, heating the mixture to about 70° C., allowing said proteinaceous matter to precipitate, and separating the precipitate from the supernatant liquid.

* * * * *